(12) United States Patent
Lee et al.

(10) Patent No.: US 10,768,324 B2
(45) Date of Patent: Sep. 8, 2020

(54) METHOD TO PREDICT PORE PRESSURE AND SEAL INTEGRITY USING FULL WAVEFIELD INVERSION

(71) Applicants: Stan Lee, Spring, TX (US); Prajnajyoti Mazumdar, Cypress, TX (US); Ratnanabha Sain, Houston, TX (US)

(72) Inventors: Stan Lee, Spring, TX (US); Prajnajyoti Mazumdar, Cypress, TX (US); Ratnanabha Sain, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 619 days.

(21) Appl. No.: 15/485,395

(22) Filed: Apr. 12, 2017

(65) Prior Publication Data

US 2017/0335675 A1 Nov. 23, 2017

Related U.S. Application Data

(60) Provisional application No. 62/338,799, filed on May 19, 2016.

(51) Int. Cl.
*G01V 1/30* (2006.01)
*G01V 1/28* (2006.01)

(52) U.S. Cl.
CPC .............. *G01V 1/306* (2013.01); *G01V 1/282* (2013.01); *G01V 1/303* (2013.01); *G01V 2210/614* (2013.01)

(58) Field of Classification Search
CPC ........ G01V 1/282; G01V 1/303; G01V 1/306; G01V 2210/614
See application file for complete search history.

(56) References Cited

U.S. PATENT DOCUMENTS 3,812,457 A 5/1974 Weller
3,864,667 A 2/1975 Bahjat
(Continued)

FOREIGN PATENT DOCUMENTS

GB 2390712 A 1/2004
WO 2006037815 A1 4/2006
(Continued)

OTHER PUBLICATIONS

Soleymani, Hamidreza, and Mohamad-Ali Riahi. "Velocity based pore pressure prediction—A case study at one of the Iranian southwest oil fields." Journal of Petroleum Science and Engineering 94 (2012): 40-46.*

(Continued)

*Primary Examiner* — Rehana Perveen
*Assistant Examiner* — Cuong V Luu
(74) *Attorney, Agent, or Firm* — ExxonMobil Upstream Research Company—Law Department

(57) ABSTRACT

A method, including: generating a velocity model for a subsurface region of the Earth by using a full wavefield inversion process; generating an impedance model for the subsurface region of the Earth by using a full wavefield inversion process; and estimating pore pressure at a prediction site in the subsurface region by integrating the velocity model and the impedance model with a velocity-based pore pressure estimation process.

7 Claims, 9 Drawing Sheets

Step 210 Hydrocarbon-buoyancy pressure

(56) References Cited

U.S. PATENT DOCUMENTS

| | | |
|---|---|---|
| 4,159,463 A | 6/1979 | Silverman |
| 4,168,485 A | 9/1979 | Payton et al. |
| 4,545,039 A | 10/1985 | Savit |
| 4,562,650 A | 1/1986 | Nagasawa et al. |
| 4,575,830 A | 3/1986 | Ingram et al. |
| 4,594,662 A | 6/1986 | Devaney |
| 4,636,957 A | 1/1987 | Vannier et al. |
| 4,675,851 A | 6/1987 | Savit et al. |
| 4,686,654 A | 8/1987 | Savit |
| 4,707,812 A | 11/1987 | Martinez |
| 4,715,020 A | 12/1987 | Landrum, Jr. |
| 4,766,574 A | 8/1988 | Whitmore et al. |
| 4,780,856 A | 10/1988 | Becquey |
| 4,823,326 A | 4/1989 | Ward |
| 4,924,390 A | 5/1990 | Parsons et al. |
| 4,953,657 A | 9/1990 | Edington |
| 4,969,129 A | 11/1990 | Currie |
| 4,982,374 A | 1/1991 | Edington et al. |
| 5,260,911 A | 11/1993 | Mason et al. |
| 5,469,062 A | 11/1995 | Meyer, Jr. |
| 5,583,825 A | 12/1996 | Carrazzone et al. |
| 5,677,893 A | 10/1997 | de Hoop et al. |
| 5,715,213 A | 2/1998 | Allen |
| 5,717,655 A | 2/1998 | Beasley |
| 5,719,821 A | 2/1998 | Sallas et al. |
| 5,721,710 A | 2/1998 | Sallas et al. |
| 5,790,473 A | 8/1998 | Allen |
| 5,798,982 A | 8/1998 | He et al. |
| 5,822,269 A | 10/1998 | Allen |
| 5,838,634 A | 11/1998 | Jones et al. |
| 5,852,588 A | 12/1998 | de Hoop et al. |
| 5,878,372 A | 3/1999 | Tabarovsky et al. |
| 5,920,838 A | 7/1999 | Norris et al. |
| 5,924,049 A | 7/1999 | Beasley et al. |
| 5,999,488 A | 12/1999 | Smith |
| 5,999,489 A | 12/1999 | Lazaratos |
| 6,014,342 A | 1/2000 | Lazaratos |
| 6,021,094 A | 2/2000 | Ober et al. |
| 6,028,818 A | 2/2000 | Jeffryes |
| 6,058,073 A | 5/2000 | VerWest |
| 6,125,330 A | 9/2000 | Robertson et al. |
| 6,219,621 B1 | 4/2001 | Hornbostel |
| 6,225,803 B1 | 5/2001 | Chen |
| 6,311,133 B1 | 10/2001 | Lailly et al. |
| 6,317,695 B1 | 11/2001 | Zhou et al. |
| 6,327,537 B1 | 12/2001 | Ikelle |
| 6,374,201 B1 | 4/2002 | Grizon et al. |
| 6,381,543 B1 | 4/2002 | Guerillot et al. |
| 6,388,947 B1 | 5/2002 | Washbourne et al. |
| 6,480,790 B1 | 11/2002 | Calvert et al. |
| 6,522,973 B1 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,593,746 B2 | 7/2003 | Stolarczyk |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,735,527 B1 | 5/2004 | Levin |
| 6,754,590 B1 | 6/2004 | Moldoveanu |
| 6,766,256 B2 | 7/2004 | Jeffryes |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,882,958 B2 | 4/2005 | Schmidt et al. |
| 6,901,333 B2 | 5/2005 | Van Riel et al. |
| 6,903,999 B2 | 6/2005 | Curtis et al. |
| 6,905,916 B2 | 6/2005 | Bartsch et al. |
| 6,906,981 B2 | 6/2005 | Vauge |
| 6,927,698 B2 | 8/2005 | Stolarczyk |
| 6,944,546 B2 | 9/2005 | Xiao et al. |
| 6,947,843 B2 | 9/2005 | Fisher et al. |
| 6,970,397 B2 | 11/2005 | Castagna et al. |
| 6,977,866 B2 | 12/2005 | Huffman et al. |
| 6,999,880 B2 | 2/2006 | Lee |
| 7,027,927 B2 | 4/2006 | Matsuoka et al. |
| 7,046,581 B2 | 5/2006 | Calvert |
| 7,050,356 B2 | 5/2006 | Jeffryes |
| 7,069,149 B2 | 6/2006 | Goff et al. |
| 7,072,767 B2 | 7/2006 | Routh et al. |
| 7,092,823 B2 | 8/2006 | Lailly et al. |
| 7,110,900 B2 | 9/2006 | Adler et al. |
| 7,184,367 B2 | 2/2007 | Yin |
| 7,230,879 B2 | 6/2007 | Herkenhoff et al. |
| 7,271,747 B2 | 9/2007 | Baraniuk et al. |
| 7,330,799 B2 | 2/2008 | Lefebvre et al. |
| 7,337,069 B2 | 2/2008 | Masson et al. |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,376,539 B2 | 5/2008 | Lecomte |
| 7,400,978 B2 | 7/2008 | Langlais et al. |
| 7,436,734 B2 | 10/2008 | Krohn |
| 7,480,206 B2 | 1/2009 | Hill |
| 7,584,056 B2 | 9/2009 | Koren |
| 7,599,798 B2 | 10/2009 | Beasley et al. |
| 7,602,670 B2 | 10/2009 | Jeffryes |
| 7,616,523 B1 | 11/2009 | Tabti et al. |
| 7,620,534 B2 | 11/2009 | Pita et al. |
| 7,620,536 B2 | 11/2009 | Chow |
| 7,646,924 B2 | 1/2010 | Donoho |
| 7,672,194 B2 | 3/2010 | Jeffryes |
| 7,672,824 B2 | 3/2010 | Dutta et al. |
| 7,675,815 B2 | 3/2010 | Saenger et al. |
| 7,679,990 B2 | 3/2010 | Herkenhoff et al. |
| 7,684,281 B2 | 3/2010 | Vaage et al. |
| 7,710,821 B2 | 5/2010 | Robertsson et al. |
| 7,715,985 B2 | 5/2010 | Van Manen et al. |
| 7,715,986 B2 | 5/2010 | Nemeth et al. |
| 7,725,266 B2 | 5/2010 | Sirgue et al. |
| 7,791,980 B2 | 9/2010 | Robertsson et al. |
| 7,835,072 B2 | 11/2010 | Izumi |
| 7,840,625 B2 | 11/2010 | Candes et al. |
| 7,940,601 B2 | 5/2011 | Ghosh |
| 8,121,823 B2 | 2/2012 | Krebs et al. |
| 8,248,886 B2 | 8/2012 | Neelamani et al. |
| 8,428,925 B2 | 4/2013 | Krebs et al. |
| 8,437,998 B2 * | 5/2013 | Routh ............ G01V 1/28 703/10 |
| 8,547,794 B2 | 10/2013 | Gulati et al. |
| 8,682,587 B2 * | 3/2014 | Singer .......... G01V 11/007 166/250.02 |
| 8,688,381 B2 | 4/2014 | Routh et al. |
| 8,781,748 B2 | 7/2014 | Laddoch et al. |
| 9,310,500 B2 * | 4/2016 | Kacewicz .......... G01V 1/303 |
| 9,841,518 B2 * | 12/2017 | Aarre ............ G01V 1/36 |
| 10,386,513 B2 * | 8/2019 | Aarre ............ G01V 1/345 |
| 2002/0049540 A1 | 4/2002 | Beve et al. |
| 2002/0099504 A1 | 7/2002 | Cross et al. |
| 2002/0120429 A1 | 8/2002 | Ortoleva |
| 2002/0183980 A1 | 12/2002 | Guillaume |
| 2004/0199330 A1 | 10/2004 | Routh et al. |
| 2004/0225438 A1 | 11/2004 | Okoniewski et al. |
| 2006/0235666 A1 | 10/2006 | Assa et al. |
| 2007/0036030 A1 | 2/2007 | Baumel et al. |
| 2007/0038691 A1 | 2/2007 | Candes et al. |
| 2007/0274155 A1 | 11/2007 | Ikelle |
| 2008/0175101 A1 | 7/2008 | Saenger et al. |
| 2008/0306692 A1 | 12/2008 | Singer et al. |
| 2009/0006054 A1 | 1/2009 | Song |
| 2009/0067041 A1 | 3/2009 | Krauklis et al. |
| 2009/0070042 A1 | 3/2009 | Birchwood et al. |
| 2009/0083006 A1 | 3/2009 | Mackie |
| 2009/0164186 A1 | 6/2009 | Haase et al. |
| 2009/0164756 A1 | 6/2009 | Dokken et al. |
| 2009/0187391 A1 | 7/2009 | Wendt et al. |

(56) References Cited

U.S. PATENT DOCUMENTS

| | | |
|---|---|---|
| 2009/0248308 A1 | 10/2009 | Luling |
| 2009/0254320 A1 | 10/2009 | Lovatini et al. |
| 2009/0259406 A1 | 10/2009 | Khadhraoui et al. |
| 2010/0008184 A1 | 1/2010 | Hegna et al. |
| 2010/0018718 A1 | 1/2010 | Krebs et al. |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |
| 2010/0185422 A1 | 7/2010 | Hoversten |
| 2010/0208554 A1 | 8/2010 | Chiu et al. |
| 2010/0212902 A1 | 8/2010 | Baumstein et al. |
| 2010/0246324 A1 | 9/2010 | Dragoset, Jr. et al. |
| 2010/0265797 A1 | 10/2010 | Robertsson et al. |
| 2010/0270026 A1 | 10/2010 | Lazaratos et al. |
| 2010/0286919 A1 | 11/2010 | Lee et al. |
| 2010/0299070 A1 | 11/2010 | Abma |
| 2011/0000678 A1 | 1/2011 | Krebs et al. |
| 2011/0040926 A1 | 2/2011 | Donderici et al. |
| 2011/0051553 A1 | 3/2011 | Scott et al. |
| 2011/0075516 A1 | 3/2011 | Xia et al. |
| 2011/0090760 A1 | 4/2011 | Rickett et al. |
| 2011/0131020 A1 | 6/2011 | Meng |
| 2011/0134722 A1 | 6/2011 | Virgilio et al. |
| 2011/0182141 A1 | 7/2011 | Zhamikov et al. |
| 2011/0182144 A1 | 7/2011 | Gray |
| 2011/0191032 A1 | 8/2011 | Moore |
| 2011/0194379 A1 | 8/2011 | Lee et al. |
| 2011/0222370 A1 | 9/2011 | Downton et al. |
| 2011/0227577 A1 | 9/2011 | Zhang et al. |
| 2011/0235464 A1 | 9/2011 | Brittan et al. |
| 2011/0238390 A1 | 9/2011 | Krebs et al. |
| 2011/0246140 A1 | 10/2011 | Abubakar et al. |
| 2011/0267921 A1 | 11/2011 | Mortel et al. |
| 2011/0267923 A1 | 11/2011 | Shin |
| 2011/0276320 A1 | 11/2011 | Krebs et al. |
| 2011/0288831 A1 | 11/2011 | Tan et al. |
| 2011/0299361 A1 | 12/2011 | Shin |
| 2011/0320180 A1 | 12/2011 | Al-Saleh |
| 2012/0010862 A1 | 1/2012 | Costen |
| 2012/0014215 A1 | 1/2012 | Saenger et al. |
| 2012/0014216 A1 | 1/2012 | Saenger et al. |
| 2012/0051176 A1 | 3/2012 | Liu |
| 2012/0073824 A1 | 3/2012 | Routh |
| 2012/0073825 A1 | 3/2012 | Routh |
| 2012/0082344 A1 | 4/2012 | Donoho |
| 2012/0143506 A1 | 6/2012 | Routh et al. |
| 2012/0215506 A1 | 8/2012 | Rickett et al. |
| 2012/0218859 A1 | 8/2012 | Soubaras |
| 2012/0275264 A1 | 11/2012 | Kostov et al. |
| 2012/0275267 A1 | 11/2012 | Neelamani et al. |
| 2012/0290214 A1 | 11/2012 | Huo et al. |

FOREIGN PATENT DOCUMENTS

| | | |
|---|---|---|
| WO | 2009067041 A1 | 5/2009 |
| WO | 2010085822 A2 | 7/2010 |
| WO | 2011040926 A1 | 4/2011 |
| WO | 2011091216 A2 | 7/2011 |
| WO | 2011093945 A1 | 8/2011 |
| WO | 2012024025 A1 | 2/2012 |
| WO | 2012041834 A1 | 4/2012 |
| WO | 2012083234 A2 | 6/2012 |
| WO | 2012134621 A1 | 10/2012 |
| WO | 2012170201 A2 | 12/2012 |
| WO | 2013081752 A2 | 6/2013 |

OTHER PUBLICATIONS

Wang, Jie, Hui Zhou, Yukun Tian, and Hongjing Zhang. "A new scheme for elastic full waveform inversion based on velocity-stress wave equations in time domain." In SEG Technical Program Expanded Abstracts 2012, pp. 1-5. Society of Exploration Geophysicists, 2012.*

Tang, Yaxun, Sunwoong Lee, Anatoly Baumstein, and Dave Hinkley. "Tomographically enhanced full wavefield inversion." In SEG Technical Program Expanded Abstracts 2013, pp. 1037-1041. Society of Exploration Geophysicists, 2013.*

Wang, Zi. "Target formation pore-pressure prediction using 3D seismic data via the Fillippone and Eaton approaches in southern Sichuan, China." PhD diss., 2014.*

Gao, H. et al. (2008), "Implementation of perfectly matched layers in an arbitrary geometrical boundary for leastic wave modeling," *Geophysics J. Int.* 174, pp. 1029-1036.

Gibson, B. et al. (1984), "Predictive deconvolution and the zero-phase source," *Geophysics* 49(4), pp. 379-397.

Godfrey, R. J. et al. (1998), "Imaging the Foiaven Ghost," *SEG Expanded Abstracts*, 4 pgs.

Griewank, A. (1992), "Achieving logarithmic growth of temporal and spatial complexity in reverse automatic differentiation," 1 *Optimization Methods and Software*, pp. 35-54.

Griewank, A. (2000), Evaluating Derivatives: Principles and Techniques of Algorithmic Differentiation, Society for Industrial and Applied Mathematics, 49 pgs.

Griewank, A. et al. (2000), "Algorithm 799: An implementation of checkpointing for the reverse or adjoint mode of computational differentiation," 26 *ACM Transactions on Mathematical Software*, pp. 19-45.

Griewank, A. et al. (1996), "Algorithm 755: A package for the automatic differentiation of algorithms written in C/C++," *ACM Transactions on Mathematical* 22(2), pp. 131-167.

Haber, E. et al. (2010), "An effective method for parameter estimation with PDE constraints with multiple right hand sides," Preprint—UBC http://www.math.ubc.ca/~haber/pubs/PdeOptStochV5.pdf.

Hampson, D.P. et al. (2005), "Simultaneous inversion of pre-stack seismic data," SEG 75th Annual Int'l. Meeting, *Expanded Abstracts*, pp. 1633-1637.

Heinkenschloss, M. (2008), :"Numerical Solution of Implicity Constrained Optimization Problems," CAAM Technical Report TR08-05, 25 pgs.

Helbig, K. (1994), "Foundations of Anisotropy for Exploration Seismics," Chapter 5, pp. 185-194.

Herrmann, F.J. (2010), "Randomized dimensionality reduction for full-waveform inversion," *EAGE abstract* G001, EAGE Barcelona meeting, 5 pgs.

Holschneider, J. et al. (2005), "Characterization of dispersive surface waves using continuous wavelet transforms," *Geophys. J. Int.* 163, pp. 463-478.

Hu, L.Z. et al. (1987), "Wave-field transformations of vertical seismic profiles," *Geophysics* 52, pp. 307-321.

Huang, Y. et al. (2012), "Multisource least-squares migration of marine streamer and land data with frequency-division encoding," *Geophysical Prospecting* 60, pp. 663-680.

Igel, H. et al. (1996), "Waveform inversion of marine reflection seismograms for P impedance and Poisson's ratio," *Geophys. J. Int* 124, pp. 363-371.

Ikelle, L.T. (2007), "Coding and decoding: Seismic data modeling, acquisition, and processing," 77th Annual Int'l. Meeting, SEG Expanded Abstracts, pp. 66-70.

Jackson, D.R. et al. (1991), "Phase conjugation in underwater acoustics," *J. Acoust. Soc. Am.* 89(1), pp. 171-181.

Jing, X. et al. (2000), "Encoding multiple shot gathers in prestack migration," *SEG International Exposition and 70th Annual Meeting Expanded Abstracts*, pp. 786-789.

Kennett, B.L.N. (1991), "The removal of free surface interactions from three-component seismograms", *Geophys. J. Int.* 104, pp. 153-163.

Kennett, B.L.N. et al. (1988), "Subspace methods for large inverse problems with multiple parameter classes," *Geophysical J.* 94, pp. 237-247.

(56) References Cited

OTHER PUBLICATIONS

Krebs, J.R. (2008), "Fast Full-wavefield seismic inversion using encoded sources," *Geophysics* 74(6), pp. WCC177-WCC188.

Krohn, C.E. (1984), "Geophone ground coupling," *Geophysics* 49(6), pp. 722-731.

Kroode, F.T. et al. (2009), "Wave Equation Based Model Building and Imaging in Complex Settings," OTC 20215, 2009 Offshore Technology Conf., Houston, TX, May 4-7, 2009, 8 pgs.

Kulesh, M. et al. (2008), "Modeling of Wave Dispersion Using Continuous Wavelet Transforms II: Wavelet-based Frequency-velocity Analysis," *Pure Applied Geophysics* 165, pp. 255-270.

Lancaster, S. et al. (2000), "Fast-track 'colored' inversion," $70^{th}$ SEG .Ann. Meeting, *Expanded Abstracts*, pp. 1572-1575.

Lazaratos, S. et al. (2009), "Inversion of Pre-migration Spectral Shaping," 2009 SEG Houston Int'l. Expo. & Ann. Meeting, *Expanded Abstracts*, pp. 2383-2387.

Lazaratos, S. (2006), "Spectral Shaping Inversion for Elastic and Rock Property Estimation," *Research Disclosure*, Issue 511, pp. 1453-1459.

Lazaratos, S. et al. (2011), "Improving the convergence rate of full wavefield inversion using spectral shaping," *SEG Expanded Abstracts* 30, pp. 2428-2432.

Lecomte, I. (2008), "Resolution and illumination analyses in PSDM: A ray-based approach," *The Leading Edge*, pp. 650-663.

Lee, S. et al. (2010), "Subsurface parameter estimation in full wavefield inversion and reverse time migration," SEG Denver 2010 Annual Meeting, pp. 1065-1069.

Levanon, N. (1988), "Radar Principles," Chpt. 1, John Whiley & Sons, New York, pp. 1-18.

Liao, Q. et al. (1995), "2.5D full-wavefield viscoacoustic inversion," *Geophysical Prospecting* 43, pp. 1043-1059.

Liu, F. et al. (2007), "Reverse-time migration using one-way wavefield imaging condition," *SEG Expanded Abstracts* 26, pp. 2170-2174.

Liu, F. et al. (2011), "An effective imaging condition for reverse-time migration using wavefield decomposition," *Geophysics* 76, pp. S29-S39.

Maharramov, M. et al. (2007) , "Localized image-difference wave-equation tomography," SEG Annual Meeting, *Expanded Abstracts*, pp. 3009-3013.

Malmedy, V. et al. (2009), "Approximating Hessians in unconstrained optimization arising from discretized problems," *Computational Optimization and Applications*, pp. 1-16.

Marcinkovich, C. et al. (2003), "On the implementation of perfectly matched layers in a three-dimensional fourth-order velocity-stress finite difference scheme," *J. of Geophysical Research* 108(B5), 2276.

Martin, G.S. et al. (2006), "Marmousi2: An elastic upgrade for Marmousi," *The Leading Edge*, pp. 156-166.

Meier, M.A. et al. (2009), "Converted wave resolution," Geophysics, 74(2):doi:10.1190/1.3074303, pp. Q1-Q16.

Moghaddam, P.P. et al. (2010), "Randomized full-waveform inversion: a dimenstionality-reduction approach," $80^{th}$ SEG Ann. Meeting, *Expanded Abstracts*, pp. 977-982.

Mora, P. (1987), "Nonlinear two-dimensional elastic inversion of multi-offset seismic data," *Geophysics* 52, pp. 1211-1228.

Abt, D.L. et al. (2010), "North American lithospheric discontinuity structured imaged by Ps and Sp receiver functions", *J. Geophys. Res.*, 24 pgs.

Akerberg, P., et al. (2008), "Simultaneous source separation by sparse radon transform," 78th SEG Annual International Meeting, *Expanded Abstracts*, pp. 2801-2805.

Aki, K. et al. (1980), "Quantitative Seismology: Theory and Methods Volume I—Chapter 7—Surface Waves in a Vertically Heterogenous Medium," W.H. Freeman and Co., pp. 259-318.

Aki, K. et al. (1980), "Quantitative Seismology: Theory and Methods Volume I," W.H. Freeman and Co., p. 173.

Aki et al. (1980), "Quantitative Seismology, Theory and Methods," Chapter 5.20, W.H. Freeman & Co., pp. 133-155.

Amundsen, L. (2001), "Elimination of free-surface related multiples without need of the source wavelet," *Geophysics* 60(1), pp. 327-341.

Anderson, J.E. et al. (2008), "Sources Near the Free-Surface Boundary: Pitfalls for Elastic Finite-Difference Seismic Simulation and Multi-Grid Waveform Inversion," $70^{th}$ EAGE Conf. & Exh., 4 pgs.

Barr, F.J. et al. (1989), "Attenuation of Water-Column Reverberations Using Pressure and Velocity Detectors in a Water-Bottom Cable," $59^{th}$ Annual SEG meeting, *Expanded Abstracts*, pp. 653-656.

Baumstein, A. et al. (2009), "Scaling of the Objective Function Gradient for Full Wavefield Inversion," SEG Houston 2009 Int'l. Expo and Annual Meeting, pp. 224-2247.

Beasley, C. (2008), "A new look at marine simultaneous sources," *The Leading Edge* 27(7), pp. 914-917.

Beasley, C. (2012), "A 3D simultaneous source field test processed using alternating projections: a new active separation method," *Geophsyical Prospecting* 60, pp. 591-601.

Beaty, K.S. et al. (2003), "Repeatability of multimode Rayleigh-wave dispersion studies," *Geophysics* 68(3), pp. 782-790.

Beaty, K.S. et al. (2002), "Simulated annealing inversion of multimode Rayleigh wave dispersion waves for geological structure," *Geophys. J. Int.* 151, pp. 622-631.

Becquey, M. et al. (2002), "Pseudo-Random Coded Simultaneous Vibroseismics," SEG Int'l. Exposition and 72th Annl. Mtg., 4 pgs.

Ben-Hadj-Ali, H. et al. (2009), "Three-dimensional frequency-domain full waveform inversion with phase encoding," *SEG Expanded Abstracts*, pp. 2288-2292.

Ben-Hadj-Ali, H. et al. (2011), "An efficient frequency-domain full waveform inversion method using simultaneous encoded sources," *Geophysics* 76(4), pp. R109-R124.

Benitez, D. et al. (2001), "The use of the Hilbert transform in ECG signal analysis," *Computers in Biology and Medicine* 31, pp. 399-406.

Berenger, J-P. (1994), "A Perfectly Matched Layer for the Absorption of Electromagnetic Waves," *J. of Computational Physics* 114, pp. 185-200.

Berkhout, A.J. (1987), "Applied Seismic Wave Theory," Elsevier Science Publishers, p. 142.

Berkhout, A.J. (1992), "Areal shot record technology," *Journal of Seismic Exploration* 1, pp. 251-264.

Berkhout, A.J. (2008), "Changing the mindset in seismic data acquisition," *The Leading Edge* 27(7), pp. 924-938.

Beylkin, G. (1985), "Imaging of discontinuities in the inverse scattring problem by inversion of a causal generalized Radon transform," *J. Math. Phys.* 26, pp. 99-108.

Biondi, B. (1992), "Velocity estimation by beam stack," *Geophysics* 57(8), pp. 1034-1047.

Bonomi, E. et al. (2006), "Wavefield Migration plus Monte Carlo Imaging of 3D Prestack Seismic Data," *Geophysical Prospecting* 54, pp. 505-514.

Boonyasiriwat, C. et al. (2010), 3D Multisource Full-Waveform using Dynamic Random Phase Encoding, SEG Denver 2010 Annual Meeting, pp. 1044-1049.

Boonyasiriwat, C. et al. (2010), 3D Multisource Full-Waveform using Dynamic Random Phase Encoding, SEG Denver 2010 Annual Meeting, pp. 3120-3124.

Bunks, C., et al. (1995), "Multiscale seismic waveform inversion," *Geophysics* 60, pp. 1457-1473.

Burstedde, G. et al. (2009), "Algorithmic strategies for full waveform inversion: 1D experiments," *Geophysics* 74(6), pp. WCC17-WCC46.

Chavent, G. et al. (1999), "An optimal true-amplitude least-squares prestack depth-migration operator," *Geophysics* 64(2), pp. 508-515.

Choi, Y. et al. (2011), "Application of encoded multisource waveform inversion to marine-streamer acquisition based on the global correlation," $73^{rd}$ EAGE Conference, *Abstract*, pp. F026.

Choi, Y et al. (2012), "Application of multi-source waveform inversion to marine stream data using the global correlation norm," *Geophysical Prospecting* 60, pp. 748-758.

Clapp, R.G. (2009), "Reverse time migration with random boundaries," SEG International Exposition and Meeting, *Expanded Abstracts*, pp. 2809-2813.

(56) References Cited

OTHER PUBLICATIONS

Dai, W. et al. (2010), "3D Multi-source Least-squares Reverse Time Migration," SEG Denver 2010 Annual Meeting, pp. 3120-3124.

Delprat-Jannuad, F et al. (2005), "A fundamental limitation for the reconstruction of impedance profiles from seismic data," *Geophysics* 70(1), pp. R1-R14.

Dickens, T.A. et al. (2011), RTM angle gathers using Poynting vectors, *SEG Expanded Abstracts* 30, pp. 3109-3113.

Donerici, B. et al. (1005), "Improved FDTD Subgridding Algorithms Via Digital Filtering and Domain Overriding," *IEEE Transactions on Antennas and Propagation* 53(9), pp. 2938-2951.

Downey, N. et al. (2011), "Random-Beam Full-Wavefield Inversion," 2011 San Antonio Annual Meeting, pp. 2423-2427.

Dunkin, J.W. et al. (1973), "Effect of Normal Moveout on a Seismic Pluse," *Geophysics* 38(4), pp. 635-642.

Dziewonski A. et al. (1981), "Preliminary Reference Earth Model", *Phys. Earth Planet. Int.* 25(4), pp. 297-356.

Ernst, F.E. et al. (2000), "Tomography of dispersive media," *J. Acoust. Soc. Am* 108(1), pp. 105-116.

Ernst, F.E. et al. (2002), "Removal of scattered guided waves from seismic data," *Geophysics* 67(4), pp. 1240-1248.

Esmersoy, C. (1990), "Inversion of P And SV waves from multicomponent offset vertical seismic profiles", *Geophysics* 55(1), pp. 39-50.

Etgen, J.T. et al. (2007), "Computational methods for large-scale 3D acoustic finite-difference modeling: A tutorial," *Geophysics* 72(5), pp. SM223-SM230.

Fallat, M.R. et al. (1999), "Geoacoustic inversion via local, global, and hybrid algorithms," *Journal of the Acoustical Society of America* 105, pp. 3219-3230.

Fichtner, A. et al. (2006), "The adjoint method in seismology I. Theory," *Physics of the Earth and Planetary Interiors* 157, pp. 86-104.

Forbriger, T. (2003), "Inversion of shallow-seismic wavefields: I. Wavefield transformation," *Geophys. J. Int.* 153, pp. 719-734.

\* cited by examiner

METHOD TO PREDICT PORE PRESSURE AND SEAL INTEGRITY USING FULL WAVEFIELD INVERSION

CROSS-REFERENCE TO RELATED APPLICATION

This application claims the benefit of U.S. Provisional Patent Application 62/338,799 filed May 19, 2016 entitled METHOD TO PREDICT PORE PRESSURE AND SEAL INTEGRITY USING FULL WAVEFIELD INVERSION, the entirety of which is incorporated by reference herein.

FIELD OF THE INVENTION

Exemplary embodiments described herein pertain generally to the field of geophysical prospecting, and more particularly to geophysical data processing. More specifically, an exemplary embodiment can predict subsurface pore pressure and characterize seal integrity.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Seismic inversion is a process of extracting information about the subsurface from data measured at the surface of the Earth during a seismic acquisition survey. In a typical seismic survey, seismic waves are generated by a source 101 positioned at a desired location. As the source generated waves propagate through the subsurface, some of the energy reflects from subsurface interfaces 105, 107, and 109 and travels back to the surface 111, where it is recorded by the receivers 103. The seismic waves 113 and 115 that have been reflected in the subsurface only once before reaching the recording devices are called primary reflections. In contrast, multiple reflections 117 and 119 are the seismic waves that have reflected multiple times along their travel path back to the surface. Surface-related multiple reflections are the waves that have reflected multiple times and incorporate the surface of the Earth or the water surface in their travel path before being recorded.

Full Wavefield Inversion (FWI) is a seismic method capable of utilizing the full seismic record, including the seismic events that are treated as "noise" by standard inversion algorithms. The goal of FWI is to build a realistic subsurface model by minimizing the misfit between the recorded seismic data and synthetic (or modeled) data obtained via numerical simulation.

FWI is a computer-implemented geophysical method that is used to invert for subsurface properties such as velocity or acoustic impedance. The crux of any FWI algorithm can be described as follows: using a starting subsurface physical property model, synthetic seismic data are generated, i.e. modeled or simulated, by solving the wave equation using a numerical scheme (e.g., finite-difference, finite-element etc.). The term velocity model or physical property model as used herein refers to an array of numbers, typically a 3-D array, where each number, which may be called a model parameter, is a value of velocity or another physical property in a cell, where a subsurface region has been conceptually divided into discrete cells for computational purposes. The synthetic seismic data are compared with the field seismic data and using the difference between the two, an error or objective function is calculated. Using the objective function, a modified subsurface model is generated which is used to simulate a new set of synthetic seismic data. This new set of synthetic seismic data is compared with the field data to generate a new objective function. This process is repeated until the objective function is satisfactorily minimized and the final subsurface model is generated. A global or local optimization method is used to minimize the objective function and to update the subsurface model.

The exploration and production industry is moving into frontier oil and gas provinces with higher well costs and drilling risks. In order to execute a drilling program in a safe, efficient and cost effective manner, accurate pre-drill prediction of pore pressure and fracture pressure is useful. In addition, seal integrity analysis is useful in understanding how much hydrocarbons can be trapped by prospect seals before mechanical leak. Conventionally, these analyses have been done using seismic velocities obtained from tomography. Tomographic velocities are used to predict pore pressure using Eaton's normal compaction trend and Bower's effective stress methods. In general, such velocity profiles are suitable for pore pressure prediction in background shales, but are too smooth to detect embedded sand reservoirs. In comparison, FWI provides higher resolution and more accurate velocity models, which provides an opportunity to do pressure prediction for the sands as well. Pressure prediction for sands allows for the appraisal of mechanical seal failure risks of overlying shales.

SUMMARY

A method, including: generating a velocity model for a subsurface region of the Earth by using a full wavefield inversion process; generating an impedance model for the subsurface region of the Earth by using a full wavefield inversion process; and estimating pore pressure at a prediction site in the subsurface region by integrating the velocity model and the impedance model with a velocity-based pore pressure estimation process.

In the method, the prediction site can include a reservoir rock, and the velocity-based pore pressure estimation process can include: identifying, within the impedance model, the reservoir rock; using the velocity model to determine or estimate shale pore pressure at a base of the reservoir rock in the impedance model; determining a buoyancy pressure of a fluid assumed to fill a column height of the reservoir rock; and the estimating the pore pressure for the reservoir rock can include combining the shale pore pressure at the base of the reservoir rock and the buoyancy pressure.

The method can further include: predicting a lithology volume for the subsurface geologic formation from the impedance model; determining Poisson's ratio within the reservoir rock based on the lithology volume and P-wave velocity from the velocity model generated using the full wavefield inversion process; and determining a full wavefield inversion lithology-based minimum horizontal stress from the Poisson's ratio.

The method can further include: analyzing seal integrity of the reservoir rock based on a difference between the estimated pore pressure and the minimum horizontal stress.

In the method, the reservoir rock can be sand.

In the method, the predicting the lithology volume can include using impedance values from an offset well.

In the method, the fluid can be one of oil, gas, or water.

The method can further include extracting hydrocarbons from the reservoir rock.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION

Exemplary embodiments are described herein. However, to the extent that the following description is specific to a particular embodiment, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

In recent years, FWI has been widely used in industry and academia to improve seismic imaging quality (Mothi, et al., 2012; Liu et al., 2014), particularly for regions with significant structural complexity. The present technological advancement can improve prediction of subsurface pore pressure estimates and can characterize seal integrity. In a non-limiting example, subsurface pore-pressure can be predicted using higher resolution and more accurate FWI velocity models (as compared to tomographic velocity) in conjunction with conventional effective stress methods. Lithology inversions can be integrated from high-resolution model domain (FWI impedance) products with velocity-based pore pressure estimation. The coupled analysis allows for the reduction in uncertainty in pressure prediction due to lithology (primarily, sand vs. shale, but other reservoir rock could be used in place of sand) changes. Further, pressure prediction in sand allows for preparation for seal integrity analysis. The results from the integrated lithology inversion can be used to appraise the risk of mechanical seal failure, given fluid-fill (or hydrocarbon type) and fluid-column height scenarios. Fracture pressure or minimum stress in the seals can be predicted by using either a constant fracture gradient measured from regional or global leak off test (LOT) databases or through geomechanical method-based estimations (viz., stress-ratio equations).

Inputs for the present technological advancement include: (1) FWI model domain products (velocity and impedance); and (2) rock physics transformations for lithology classification, velocity pressure relations and lithology-based Poisson's ratio estimation.

Compared to conventional techniques, the present technological advancement can use higher resolution (~0-15 Hz) velocities from FWI instead of lower resolution tomographic velocities, uses lithology (sand vs. shale)—dependent pressure-velocity relations for estimating pore-pressure from FWI P-velocity inversion instead of using a single pressure-velocity relation, and uses data-driven seal strength from seismic methods to analyze seal integrity instead of using spatially continuous or homogenous seal properties.

Figure 1:
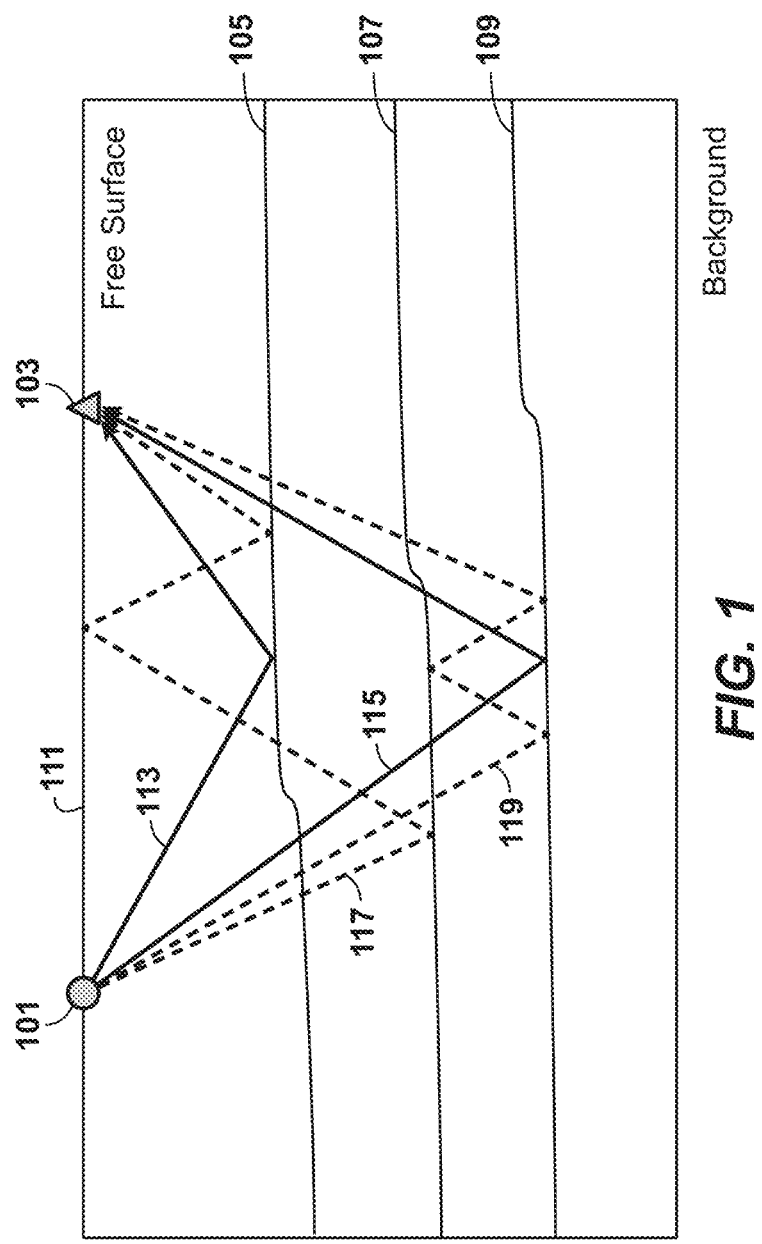
FIG. 1 illustrates an example of a conventional seismic acquisition.
Figure 2:
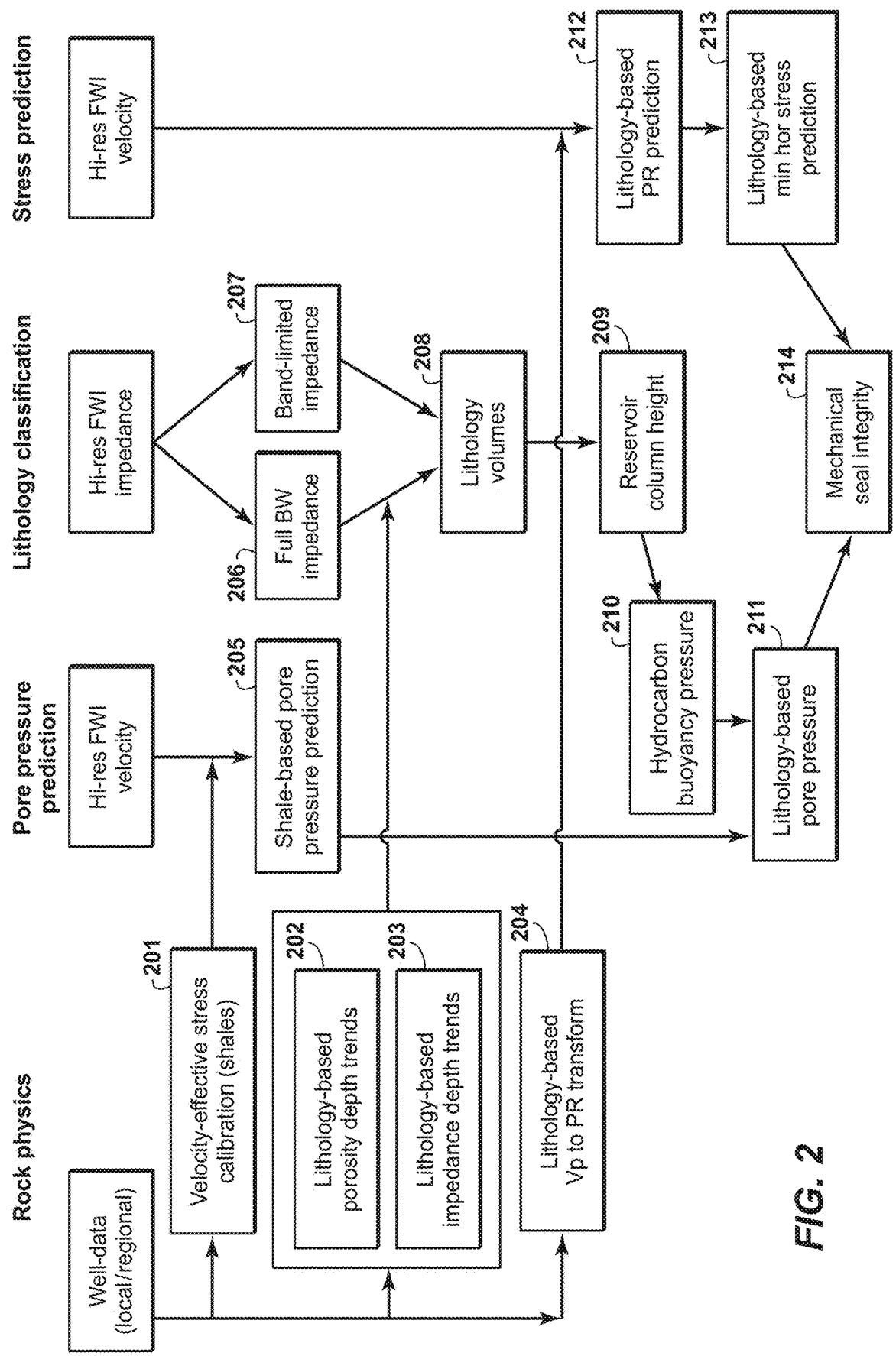
FIG. 2 illustrates an exemplary method for predicting pore pressure and seal integrity.
Figure 3:
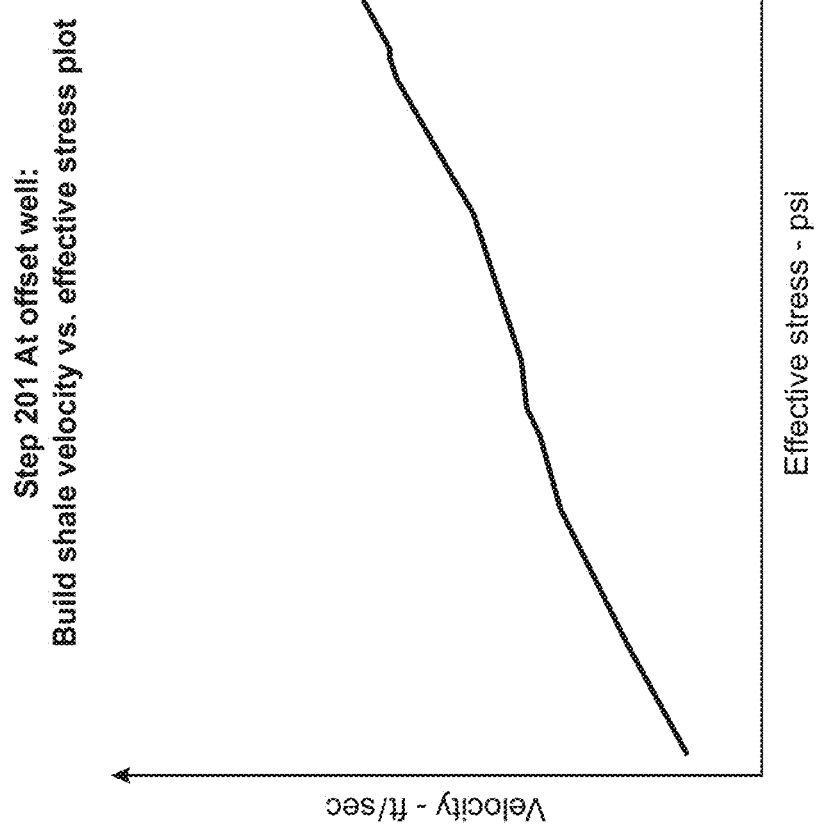
FIG. 3 illustrates an exemplary plot of velocity vs. effective stress.

FIG. 2 illustrates an exemplary method for predicting pore pressure and seal integrity. Step 201 includes building a shale-velocity vs. effective stress plot (see FIG. 3) for an offset well. Offset well density and pressure data can be used to calculate overburden pressure from density logs. As shown below in equation 1, effective stress is equal to overburden pressure minus pore pressure.

$$\text{Effective Stress} = \text{Overburden Pressure} - \text{pore pressure} \quad \text{(Eqn. 1)}$$

Pore pressure can be either obtained by direct measurement in the field or estimated from drilling mud weight. Sand pore pressure is usually obtained from the direct measurement in the reservoir. Shale pore pressure can be measured in the formation or estimated from drilling parameters and well events.

Figure 4:
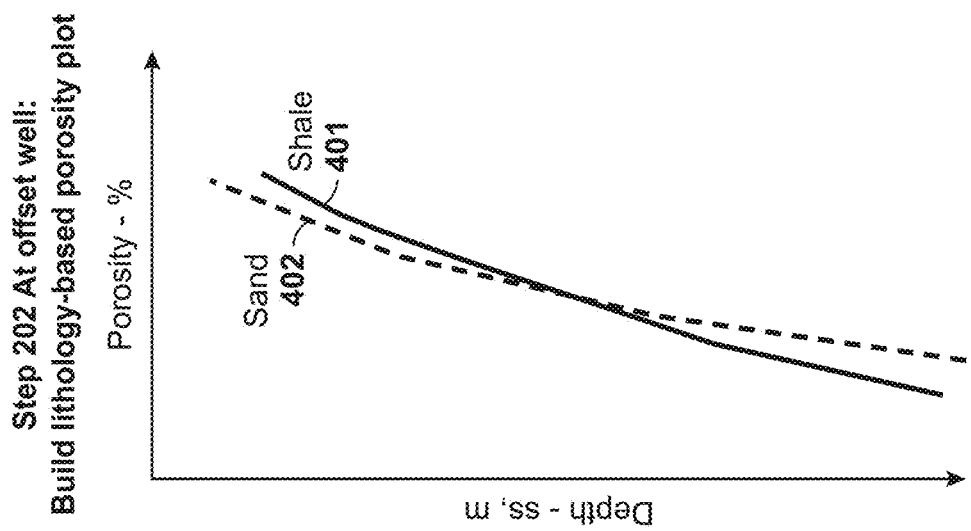
FIG. 4 illustrates an exemplary plot of porosity vs. depth.

Step 202 includes building a lithology based porosity plot for an offset well (see FIG. 4). Offset well log data and core analyses can be used to build a shale porosity vs. depth compaction trend 401 and a sand porosity vs. depth compaction trend 402 (see FIG. 4).

Figure 5:
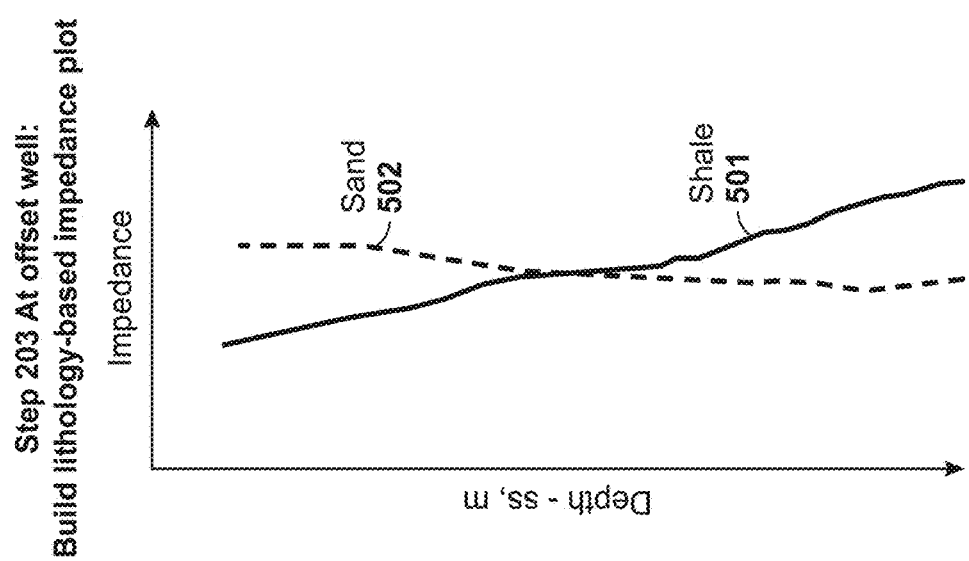
FIG. 5 illustrates an exemplary plot of impedance vs. depth.

Step 203 includes building a lithology-based impedance plot (see FIG. 5). Offset well velocity and density are used to obtain acoustic impedance by multiplying velocity and density. As shown in FIG. 5, a shale acoustic impedance vs. depth trend 501 is generated and a sand acoustic impedance vs. depth trend 502 is generated.

Figure 6:
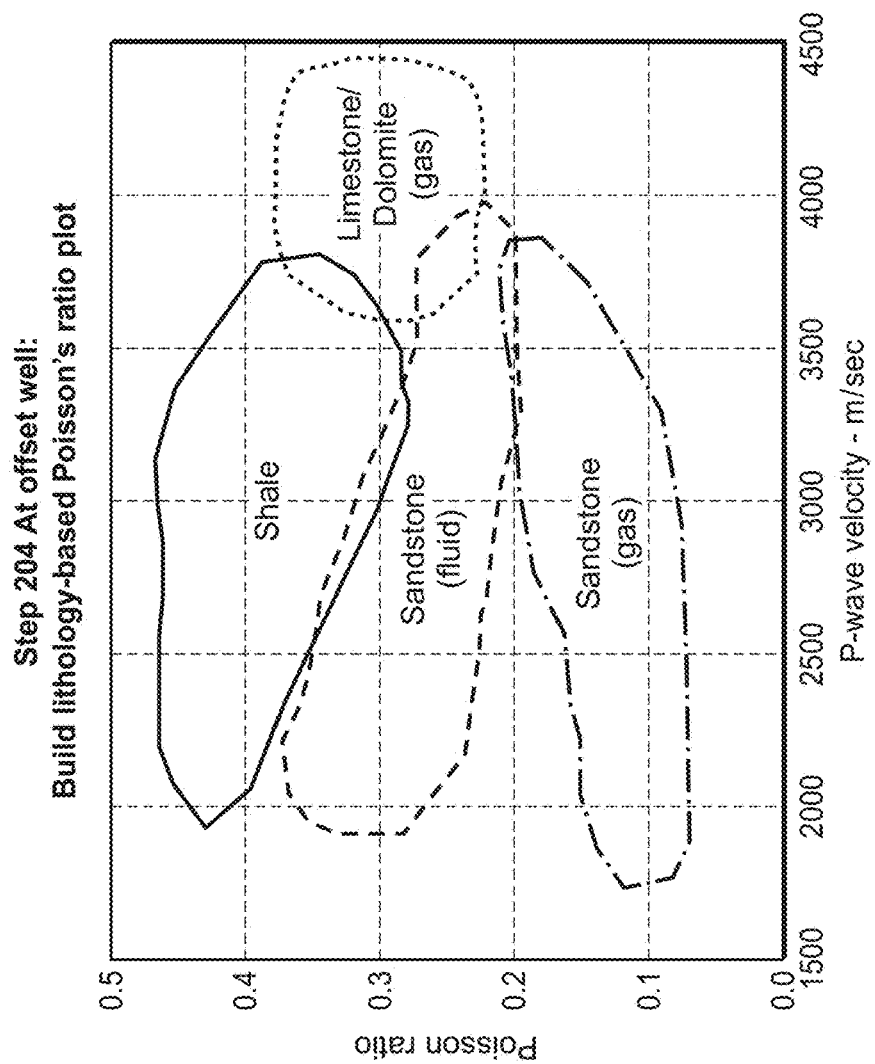
FIG. 6 illustrates an exemplary Poisson's ratio cross-plot.

Step 204 includes building a lithology-based Poisson's ratio cross plot at an offset well (see, FIG. 6). The offset wells primary velocity (Vp) and secondary velocity (Vs) are used to calculate Poisson's ratio 6, as shown in equation 2.

$$\sigma = \tfrac{1}{2}(V_P^2 - 2V_S^2)/(V_P^2 - V_S^2) \quad \text{(Eqn. 2)}$$

The cross-plot in FIG. 6 is generated based on the Poisson's ratio and P-wave velocity. (VES). Shale pore pressure at the prediction location can be obtained via equation 1.

Figure 7:
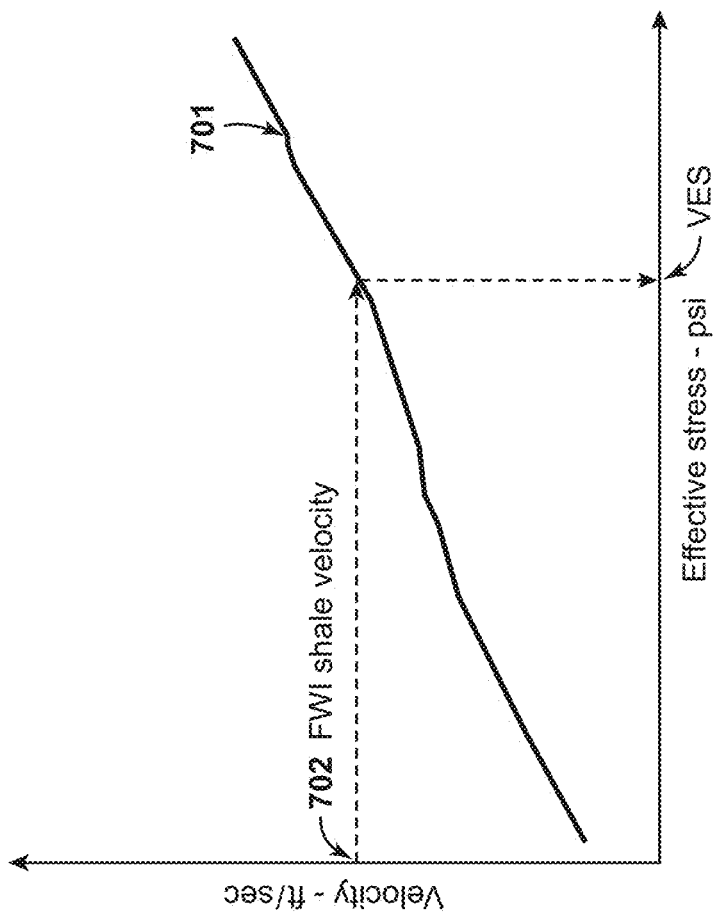
FIG. 7 illustrates an exemplary plot of velocity vs effective stress from FWI shale velocity.

Step 205 includes calculating the overburden pressure at the prediction location. The velocity vs. effective stress plot from step 201 is shown as 701 in FIG. 7, along with the FWI shale velocity 702, and FWI shale velocity is used to obtain the effective stress.

Step 206 includes generating high frequency FWI full bandwidth (BW) and band-limited impedance data using seismic shot gathers. The following is an example of an algorithm for performing local cost function optimization in FWI. This procedure is iterated by using the new updated model as the starting model for another gradient search. The process continues until an updated model is found that satisfactorily explains the observed data. Commonly used local cost function inversion methods include gradient search, conjugate gradients and Newton's method.

Local cost function optimization of seismic data in the acoustic approximation is a common geophysical inversion task, and is generally illustrative of other types of geophysical inversion. When inverting seismic data in the acoustic approximation the cost function can be written as:

$$S(M) = \sum_{g=1}^{N_g} \sum_{r=1}^{N_r} \sum_{t=1}^{N_t} W(\psi_{calc}(M, r, t, w_g) - \psi_{obs}(r, t, w_g))$$ (Eqn. 3)

where:
S=cost function,
M=vector of N parameters, $(m_1, m_2, \ldots m_N)$ describing the subsurface model,
g=gather index,
$w_g$=source function for gather g which is a function of spatial coordinates and time, for a point source this is a delta function of the spatial coordinates,
$N_g$=number of gathers,
r=receiver index within gather,
$N_r$=number of receivers in a gather,
t=time sample index within a trace,
$N_t$=number of time samples,
W=minimization criteria function (a preferred choice is $W(x)=x^2$, which is the least squares (L2) criteria),
$\psi_{calc}$=calculated seismic data from the model M,
$\psi_{obs}$=measured seismic data.

The gathers can be any type of gather that can be simulated in one run of a seismic forward modeling program. Usually the gathers correspond to a seismic shot, although the shots can be more general than point sources. For point sources the gather index g corresponds to the location of individual point sources. For plane wave sources g would correspond to different plane wave propagation directions. This generalized source data, $\psi_{obs}$, can either be acquired in the field or can be synthesized from data acquired using point sources. The calculated data $\psi_{calc}$ on the other hand can usually be computed directly by using a generalized source function when forward modeling. For many types of forward modeling, including finite difference modeling, the computation time needed for a generalized source is roughly equal to the computation time needed for a point source.

Equation (3) can be simplified to:

$$S(M) = \sum_{g=1}^{N_g} W(\delta(M, w_g)).$$ (Eqn. 4)

where the sum over receivers and time samples is now implied and, $$\delta(M, w_g) = \psi_{calc}(M, w_g) - \psi_{obs}(w_g).$$ (Eqn. 5)

Inversion attempts to update the model M such that S(M) is a minimum. This can be accomplished by local cost function optimization which updates the given model $M^{(k)}$ as follows:

$$M^{(k+1)} = M^{(k)} - \alpha^{(k)} \nabla_M S(M)$$ (Eqn. 6)

where k is the iteration number, α is the scalar size of the model update, and $\nabla_M S(M)$ is the gradient of the misfit function, taken with respect to the model parameters. The model perturbations, or the values by which the model is updated, are calculated by multiplication of the gradient of the objective function with a step length a, which must be repeatedly calculated.

From equation (4), the following equation can be derived for the gradient of the cost function:

$$\nabla_M S(M) = \sum_{g=1}^{N_g} \nabla_M W(\delta(M, w_g))$$ (Eqn. 7)

So to compute the gradient of the cost function one must separately compute the gradient of each gather's contribution to the cost function, then sum those contributions. Therefore, the computational effort required for computing $\nabla_M S(M)$ is $N_g$ times the compute effort required to determine the contribution of a single gather to the gradient. For geophysical problems, $N_g$ usually corresponds to the number of geophysical sources and is on the order of 10,000 to 100,000, greatly magnifying the cost of computing $\nabla_M S(M)$.

Note that computation of $\nabla_M W(\delta)$ requires computation of the derivative of $W(\delta)$ with respect to each of the N model parameters $m_1$. Since for geophysical problems N is usually very large (usually more than one million), this computation can be extremely time consuming if it had to be performed for each individual model parameter. Fortunately, the adjoint method can be used to efficiently perform this computation for all model parameters at once. The adjoint method for the least squares objective function and a gridded model parameterization is summarized by the following algorithm:

1. Compute forward simulation of the data using the current model and the gather signature $w_g$ as the source to get $\psi_{calc}(M^{(k)}, w_g)$,
2. Subtract the observed data from the simulated data giving $\delta(M^{(k)}, w_g)$,
3. Compute the reverse simulation (i.e. backwards in time) using $\delta(M^{(k)}, w_g)$ as the source producing $\psi_{adjoint}(M^{(k)}, w_g)$,
4. Compute the integral over time of the product of $\psi_{calc}(M^{(k)}, w_g)$ and $\psi_{adjoint}(M^{(k)}, w_g)$ to get $\nabla_M W(\delta(M, w_g))$.

Figure 8:
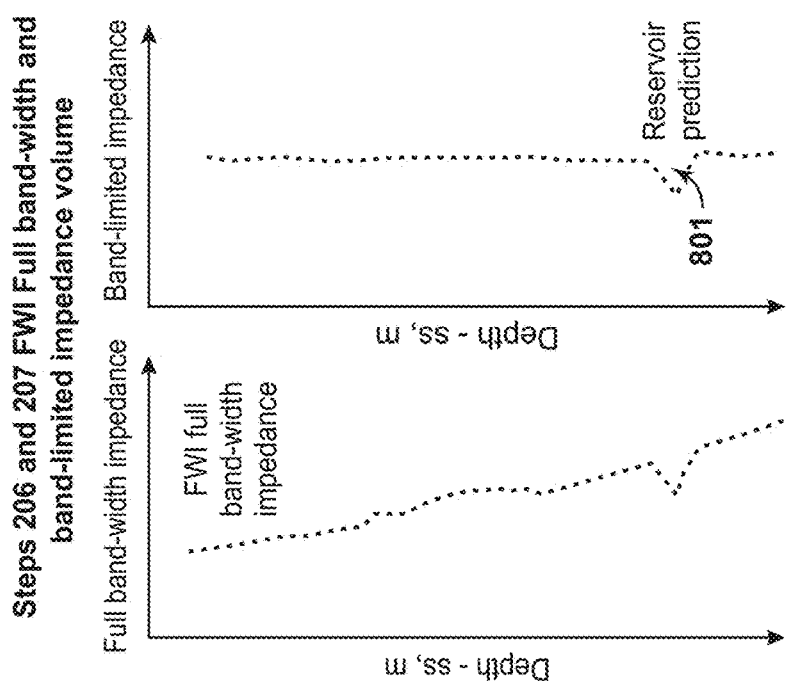
FIG. 8 illustrates an exemplary plot of impedance vs. depth from FWI full bandwidth impedance and FWI band limited impedance.

Step 207 includes generating the FWI band limited impedance. The FWI band limited impedance is determined by: FWI Band Limited Impedance=FWI Full Bandwidth Impedance−Shale Impedance Trend. FIG. 8 shows a comparison of the FWI band-limited impedance and the FWI full bandwidth impedance. In FIG. 8, 801 identifies the reservoir prediction of an anomaly (i.e., a sand body). FWI is able to show the anomaly 801, whereas tomographic velocity would not.

Figure 9:
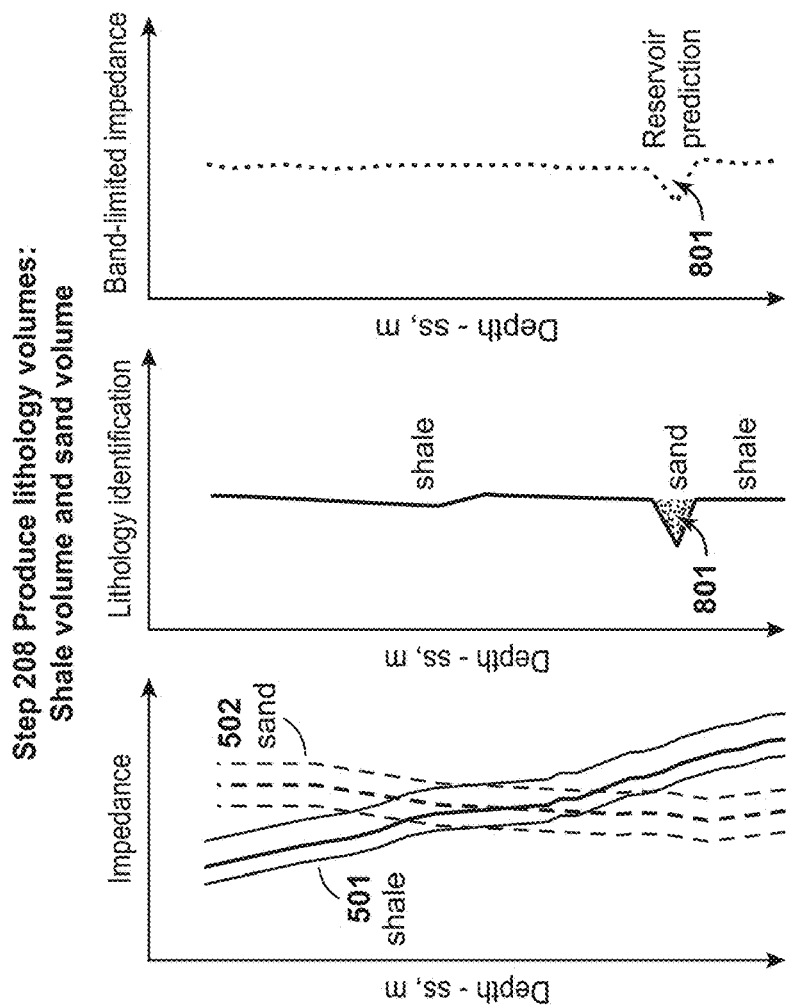
FIG. 9 illustrates an exemplary plot of Vclay vs. depth.

Step 208 includes producing lithology volumes (shale volume and sand volume). FWI full bandwidth impedance minus shale impedance 501 is used to obtain shale lithology identification. FWI full bandwidth impedance minus sand impedance 502 is used to obtain sand lithology identification. FWI band-limited impedance is used to check the sand lithology classification and shale lithology classification when the curves 501 and 502 are off compaction trend. FIG. 9 shows lithology for shale and sand, including the sand anomaly 801.

Figure 10:
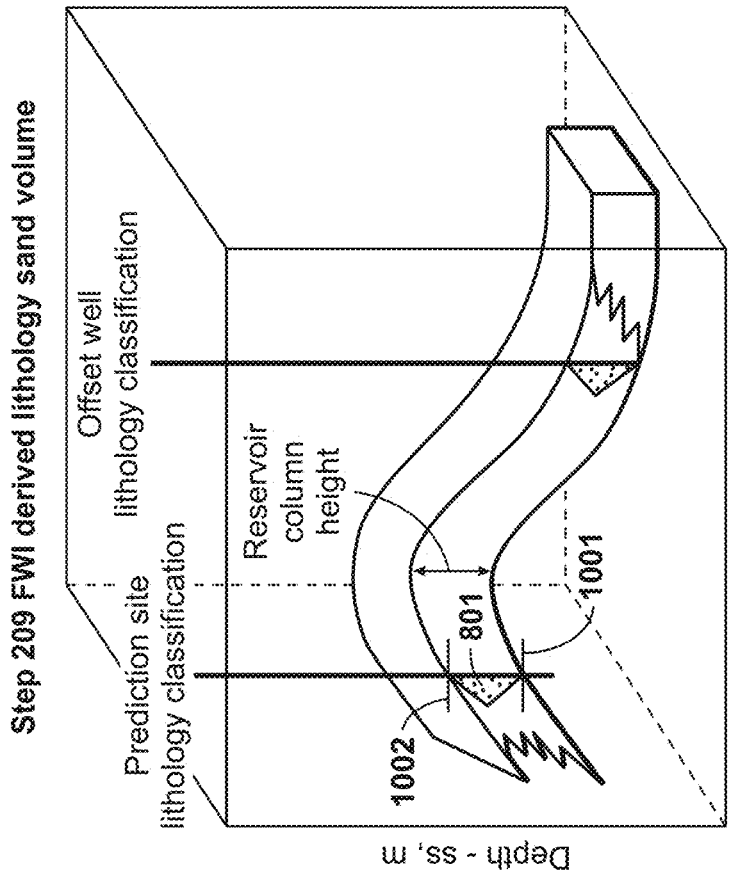
FIG. 10 illustrates an exemplary FWI derived lithology sand volume.

Step 209 includes determining the reservoir column height. The FWI derived lithology from step 208 is used to determine reservoir and column heights. As indicated in FIG. 10, the FWI derived lithology from step 208 is consistent with offset well lithology log at an offset well location. At the new prediction location, FWI derived lithology is used to digitize the top 1002 of the sand body and base 1001 of the sand body 801. The column height of sand body 801 is the elevation between top of reservoir 1001 and the deepest portion of the entire reservoir body 1002.

Figure 11:
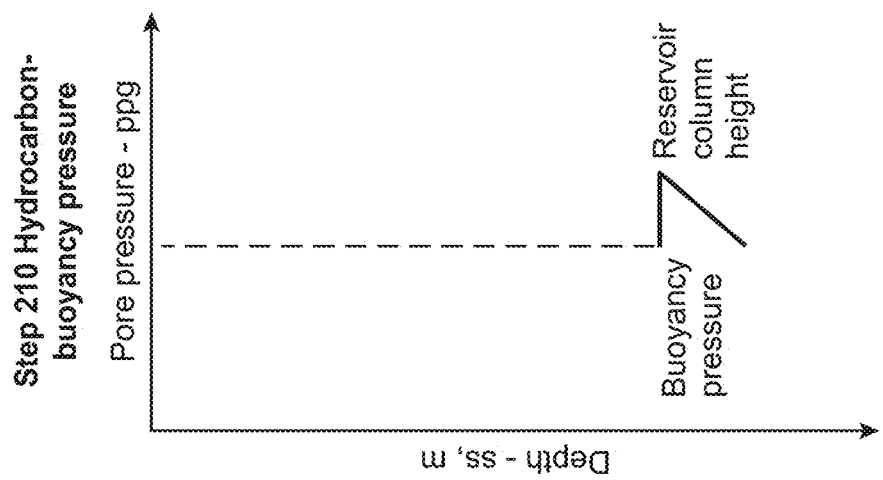
FIG. 11 illustrates an exemplary buoyancy pressure determination.

In step 210, hydrocarbon buoyancy pressure is determined. Fluid is assumed to fill the column height of the sand body 801 (sand thickness). This is further illustrated in FIG. 11. The buoyancy pressure due to the existence of the fluid (gas/oil/water) in the sand body 801 is calculated.

$$F_b = g\rho V = \rho g h A \qquad \text{(Eqn. 8)}$$

$F_b$ is the buoyant force, $\rho$ is the density of the fluid, g is gravity, V is the volume of the immersed part of the body in the fluid, h is the height of the immersed part, and A is the surface area of the immersed part. The fluid, whether gas, oil, or water, can be determined from amplitude vs offset (AVO) analysis or from data provided by the offset well.

Figure 12:
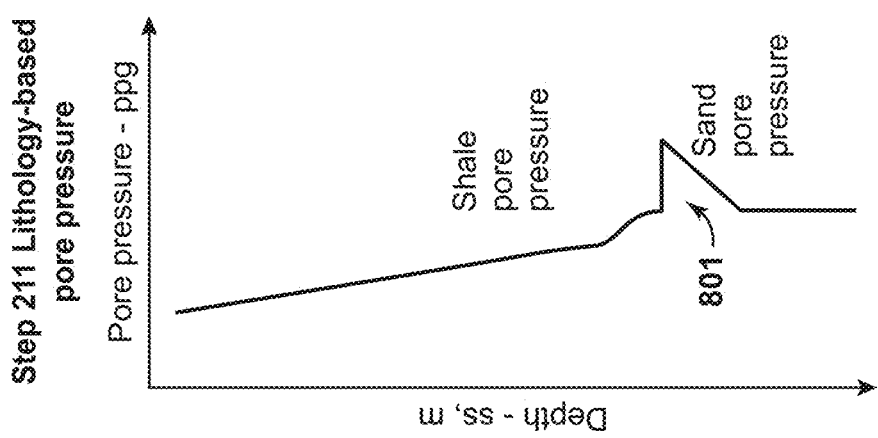
FIG. 12 illustrates an exemplary plot of pore pressure vs. depth for lithology based pore pressure.

In step 211, lithology-based pore pressure is predicted. This is determined from the shale pore pressure from step 205 and buoyancy pressure from step 210. At the prediction site, shale pore pressure is used as a background pore pressure. At the base of the sand body, the shale pore pressure will be used. The pressure within the sand is calculated from the sum of the fluid buoyancy pressure from step 210 and the base of shale pressure. This is further illustrated in FIG. 12.

Figure 13:
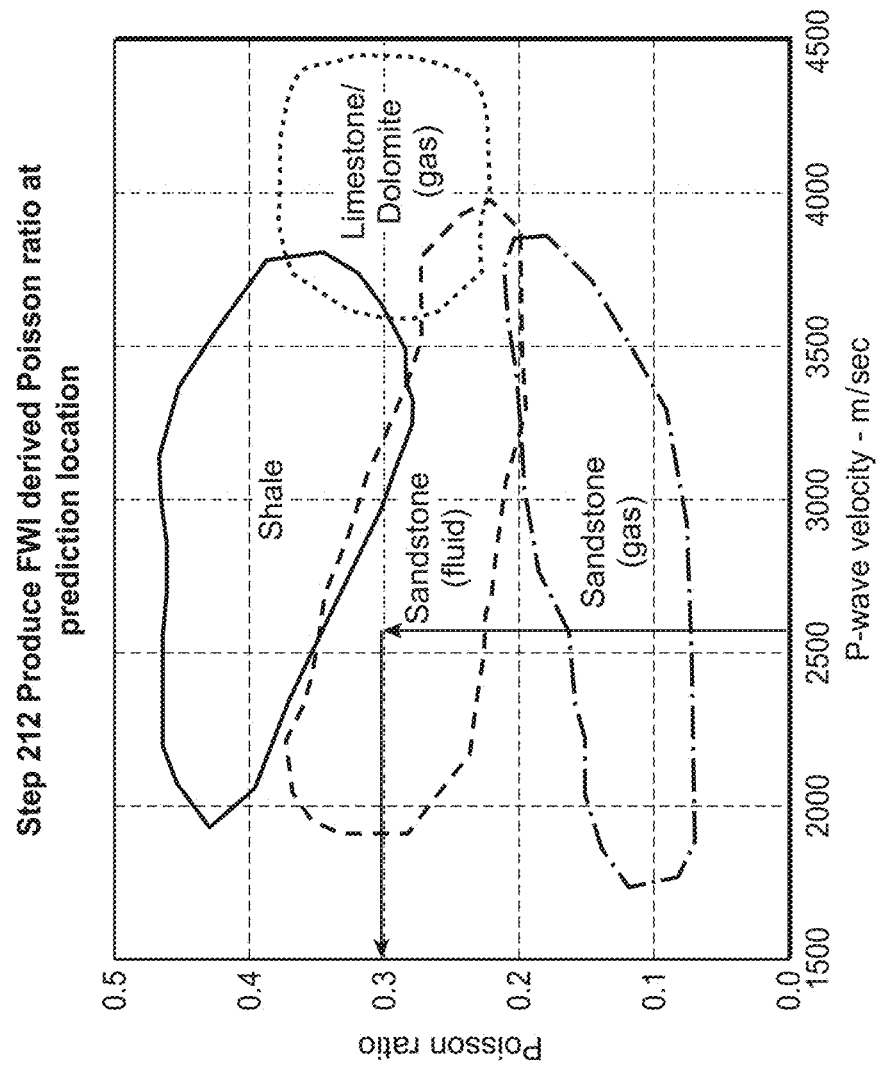
FIG. 13 illustrates an exemplary derivation of FWI derived Poisson's ratio at a predicted location.

Step 212 includes producing an FWI derived Poisson ratio (PR) at the prediction location (i.e., the sand anomaly 801). A high-resolution FWI velocity model, offset well lithology-based Poisson's ratio vs. velocity cross-plot from step 204 and lithology prediction from step 208 are used to predict the Poisson's ratio with the specific FWI P-wave velocity. This is further illustrated in FIG. 13.

Figure 14:
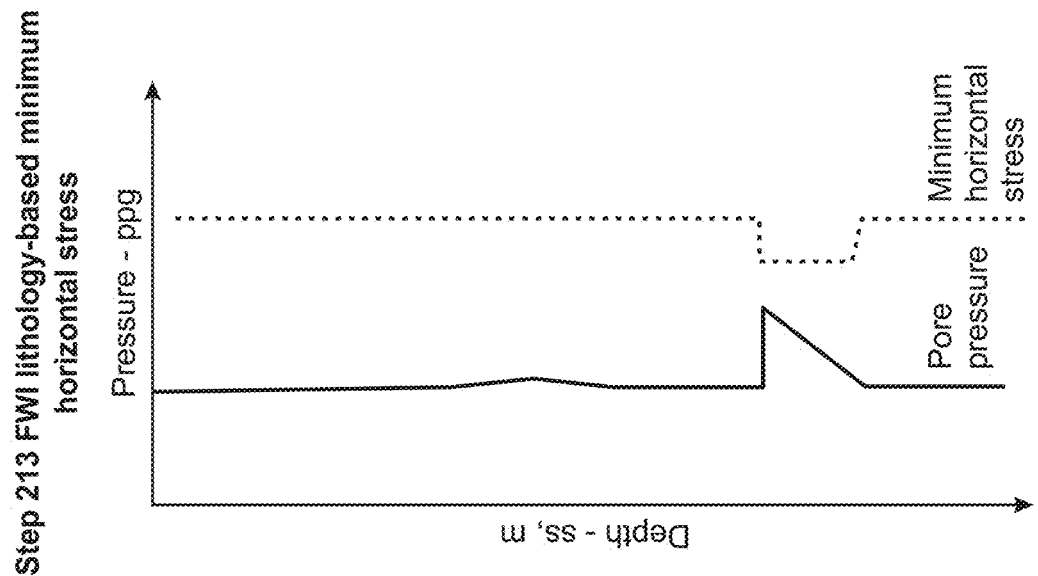
FIG. 14 illustrates an exemplary plot of minimum horizontal stress vs. depth for FWI lithology-based minimum horizontal stress.

Step 213 includes determining FWI lithology-based minimum horizontal stress. The minimum horizontal stress is determined from:

$$\text{Minimum horizontal stress} = \text{pore pressure} + Ko*(\text{overburden pressure} - \text{pore pressure}) + \text{tectonic term}, \qquad \text{(Eqn. 9)}$$

where the tectonic term is the lateral stress introduced by lateral movement of formation due to tectonic forces, and $$Ko = a * \frac{\sigma}{1-\sigma},$$

wherein $\sigma$ is Poisson's ratio, and a=constant that can be estimated from the offset well. The constant a can be obtained by matching offset well fracture pressure with calculated minimum horizontal stress using equation 9. FIG. 14 provides a comparison of the pore pressure and the minimum horizontal stress.

Step 214 includes obtaining the FWI derived mechanical seal integrity, which is calculated by the difference between the minimum horizontal stress and the pore pressure. As minimum horizontal stress gets closer to pore pressure, the mechanical seal will begin to fail. The values of mechanical seal integrity are close to zero.

Pore pressure predictions and mechanical seal integrity can be used to manage hydrocarbons. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

In all practical applications, the present technological advancement must be used in conjunction with a computer, programmed in accordance with the disclosures herein. Preferably, in order to efficiently perform FWI, the computer is a high performance computer (HPC), known to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

The present techniques may be susceptible to various modifications and alternative forms, and the examples discussed above have been shown only by way of example. However, the present techniques are not intended to be limited to the particular examples disclosed herein. Indeed, the present techniques include all alternatives, modifications, and equivalents falling within the spirit and scope of the appended claims.

What is claimed is:

1. A method, comprising:
   generating a velocity model for a subsurface region of the Earth by using one or more full wavefield inversion processes;
   generating an impedance model for the subsurface region of the Earth by using one or more full wavefield inversion processes;
   estimating pore pressure at a prediction site in the subsurface region by integrating the velocity model and the impedance model with a velocity-based pore pressure estimation process, wherein the prediction site includes a reservoir rock, and wherein the velocity-based pore pressure estimation process comprises:
      identifying, within the impedance model, the reservoir rock;
      using the velocity model to determine or estimate shale pore pressure at a base of the reservoir rock in the impedance model;
      determining a buoyancy pressure of a fluid assumed to fill a column height of the reservoir rock; and
      the estimating the pore pressure for the reservoir rock includes combining the shale pore pressure at the base of the reservoir rock and the buoyancy pressure;
   charactering a mechanical seal integrity of the subsurface region using the estimated pore pressure; and
   managing hydrocarbons in the subsurface region using the estimated pore pressure and mechanical seal integrity.

2. The method of claim 1, further comprising:
   predicting a lithology volume for the subsurface geologic formation from the impedance model;

determining Poisson's ratio within the reservoir rock based on the lithology volume and P-wave velocity from the velocity model generated using the full wavefield inversion process; and determining a full wavefield inversion lithology-based minimum horizontal stress from the Poisson's ratio.

3. The method of claim 2, further comprising:

analyzing seal integrity of the reservoir rock based on a difference between the estimated pore pressure and the minimum horizontal stress.

4. The method of claim 3, wherein the reservoir rock is sand.

5. The method of claim 2, wherein the predicting the lithology volume includes using impedance values from an offset well.

6. The method of claim 1, wherein the fluid is one of oil, gas, or water.

7. The method of claim 1, wherein managing hydrocarbons comprises extracting hydrocarbons from the reservoir rock.

* * * * *